(12) United States Patent
Fink

(10) Patent No.: US 6,490,590 B1
(45) Date of Patent: Dec. 3, 2002

(54) METHOD OF GENERATING A LOGICAL DATA MODEL, PHYSICAL DATA MODEL, EXTRACTION ROUTINES AND LOAD ROUTINES

(75) Inventor: Ronald Fink, Huntington Valley, PA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/503,251

(22) Filed: Feb. 14, 2000

(51) Int. Cl.[7] ............................................... G06F 17/30
(52) U.S. Cl. ......................... 707/100; 707/1; 707/104.1
(58) Field of Search ............................. 707/102, 10, 3, 707/1, 100, 104.1; 717/1

(56) References Cited

U.S. PATENT DOCUMENTS

| | | | |
|---|---|---|---|
| 5,047,923 A | | 9/1991 | Elstner et al. ............ 707/104.1 |
| 5,345,586 A | | 9/1994 | Hamala et al. ................ 707/10 |
| 5,485,610 A | * | 1/1996 | Gioielli et al. .............. 707/102 |
| 5,611,076 A | | 3/1997 | Durflinger et al. .......... 707/102 |
| 5,625,816 A | | 4/1997 | Burdick et al. ......... 707/103 R |
| 5,630,127 A | | 5/1997 | Moore et al. ................... 705/1 |
| 5,649,190 A | | 7/1997 | Sharif-Askary et al. .... 707/101 |
| 5,713,014 A | | 1/1998 | Durflinger et al. ............. 707/4 |
| 5,734,887 A | | 3/1998 | Kingberg et al. ............... 707/4 |
| 5,758,345 A | * | 5/1998 | Wang ........................ 707/100 |
| 5,806,068 A | | 9/1998 | Shaw et al. ............. 707/103 R |
| 5,809,296 A | | 9/1998 | Yong et al. .................. 707/101 |
| 6,167,405 A | * | 12/2000 | Rosensteel, Jr. et al. ..... 707/102 |
| 6,178,418 B1 | * | 1/2001 | Singer ........................... 707/3 |
| 6,233,537 B1 | * | 5/2001 | Gryphon et al. ............... 703/1 |
| 6,237,003 B1 | * | 5/2001 | Lewish et al. .............. 707/101 |
| 6,266,666 B1 | * | 7/2001 | Ireland et al. ................ 707/10 |
| 6,349,404 B1 | * | 2/2002 | Moore et al. ................... 717/1 |

* cited by examiner

Primary Examiner—Jean R. Homere
Assistant Examiner—Cheryl Lewis
(74) Attorney, Agent, or Firm—Lowe Hauptman Gilman & Berner, LLP

(57) ABSTRACT

A logical data model is generated based on business rule metadata, data source characteristics, and cleansing, transformation, and householding metadata. A physical data model and extraction and loading routines are generated from the logical data model. A physical database design (PDD) and data description language (DDL) are created for constructing a data warehouse. The data warehouse is constructed according to the PDD and DDL. Data is moved from the data source to the system database for cleansing, transforming, and householding. The data is then loaded into the data warehouse.

16 Claims, 4 Drawing Sheets

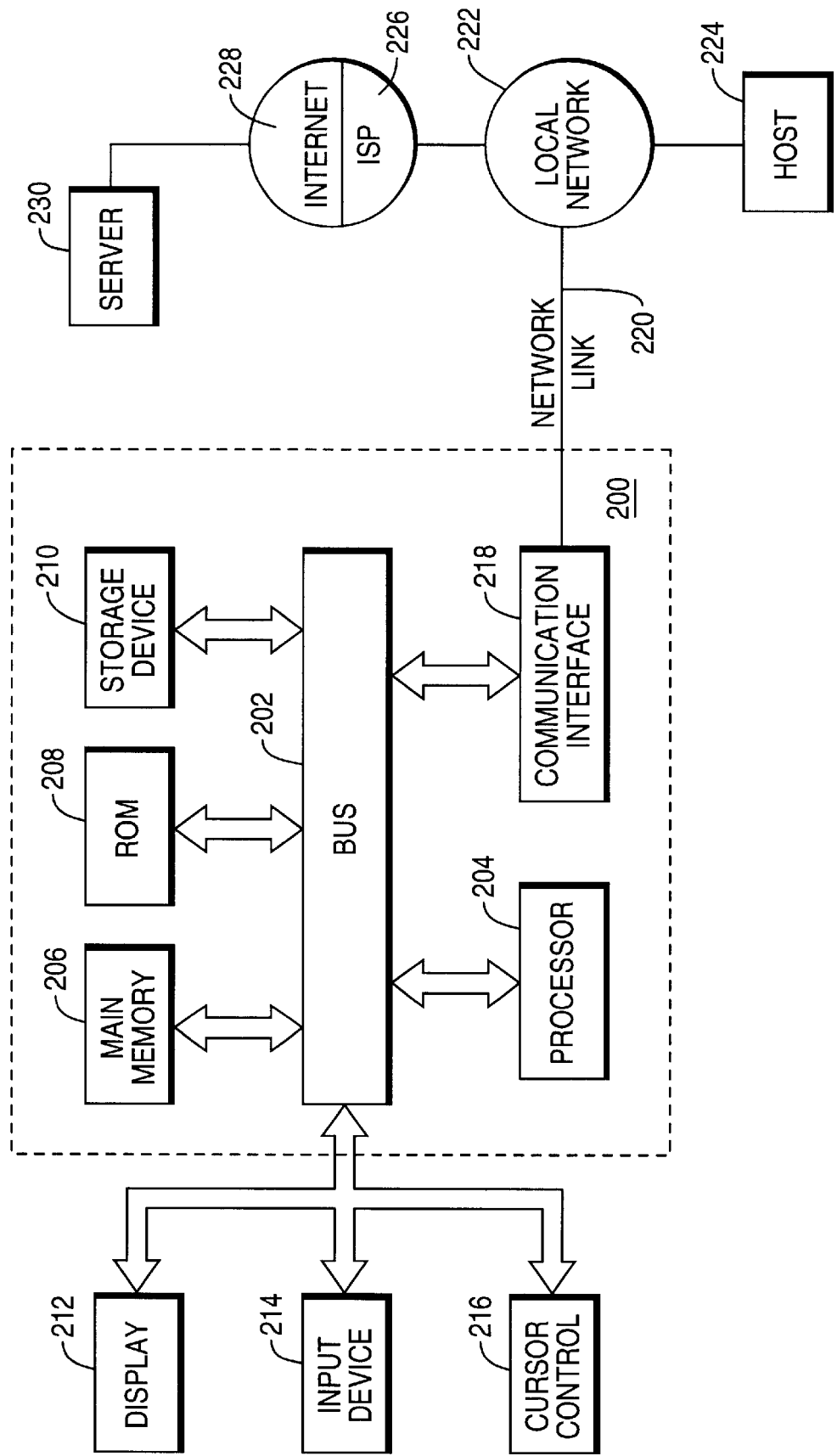

METHOD OF GENERATING A LOGICAL DATA MODEL, PHYSICAL DATA MODEL, EXTRACTION ROUTINES AND LOAD ROUTINES

FIELD OF INVENTION

The present invention relates generally to the generation of a logical data model (LDM) and a physical data model (PDM) of a data base, and more particularly, to a generalized LDM and corresponding tool for maintaining correspondence between the LDM and PDM. The present invention also relates to using a physical database design and data description language created from the PDM to construct a data warehouse.

BACKGROUND ART

The manual creation and population, or loading, of a data warehouse with data from varied data sources is known. Also known are automatic routines for loading data into a data warehouse, as described below. Prior approaches required duplication of effort and data to create new LDMs, new PDMs, new extraction routines, and new loading routines for every customer. Upwards of 80% of the time is spent creating and recreating LDMs, PDMs, and extraction and loading routines under prior approaches.

A prior approach for creating and populating a data warehouse using LDMs and PDMs is illustrated by the flow chart, generally designated by reference numeral 100, in FIG. 1. A description of the prior approach as shown in FIG. 1 follows. Beginning at step 102, a subject matter expert (SME) provides business rules to a modeler.

The SME, or domain expert, is a person with intimate knowledge of the particular area or topic for which the data warehouse is being constructed. The modeler is a person knowledgeable about transforming or creating representations of business rules in a data model. Business rules express the constraints on business operations in the real world.

In step 104, the modeler converts the business rules, received from the SME in step 102, into a logical data model using a data modeling tool, such as ERwin available from Platinum Technology, Inc. Other similar data modeling tools include PowerDesigner available from Sybase, Inc. and System Architect available from Popkin Software and Systems. After the modeler has converted the business rules into data structures in the LDM in step 104, the modeler produces a PDM using a data modeling tool, such as ERwin, in step 106.

The PDM of step 106 is produced in accordance with the LDM of step 104, regardless of intervening changes to the LDM occurring between the end of step 104 and the completion of step 106. In other words, changes made to the LDM while step 106 is in progress are not necessarily reflected in the final PDM of step 106.

In step 108, a data information analyst (DIA) determines data sources for a necessary attribute list (NAL). The NAL is developed by the DIA based on the DIA's domain knowledge and the LDM. The NAL includes those fields required by the system in order to operate properly and answer the business-related questions of the user.

In response to the NAL determination of step 108 and the PDM production of step 106, the DIA produces a cross referenced source-target data list in step 110. The source-target data list produced in step 110 cross references data sources for the NAL, identified in step 108, to fields or objects in the PDM.

After the DIA produces the source-target data list, an extract specialist determines a method of operating on a chosen source system to obtain formatted data in step 112. The source system includes the data to be converted and moved into the data warehouse. The extract specialist causes the data from the source system to be converted to the data format needed by the loading effort.

The loading effort is performed by any one of several available utilities for populating the data warehouse. Some example utilities include FastLoad, MultiLoad, and Tpump available from the NCR Corporation.

The FastLoad utility loads empty tables in the data warehouse with data collected from channel and network attached clients. FastLoad can be executed from any client platform, mainframe, UNIX® or Windows NT® system. Data splitting, data conversion, data movement and data loading are all automatic and are all performed in parallel. FastLoad is fully restartable, enabling the data load process to automatically begin loading from the last transient journal checkpoint simply by re-executing the job.

The MultiLoad utility or MLOAD handles loading, updating and deleting data in existing tables as a single, integrated process with the MultiLoad utility. MultiLoad handles extremely large data volumes requiring updates and deletes. MultiLoad enables rapid acquisition of host data with rapid block-level application of data into tables. Large inserts, deletes, updates, and upserts against empty or populated tables and data maintenance on multiple tables are performed simultaneously. MultiLoad executes on a variety of client platforms, in a fail safe mode and is fully recoverable with an inherent checkpoint design.

The TPump utility handles loading near real-time data into the data warehouse. TPump inserts, updates and deletes data in the data warehouse in a continuous fashion. TPump uses row hash locks instead of table level locks thereby enabling users to run queries while TPump is working.

Once the method for obtaining formatted data is determined in step 112, the formatted data is extracted from the source system and communicated to a database management system in step 114, e.g., the Teradata Relational Database Management System (RDBMS) available from the NCR Corporation.

In step 116, the cleansing, transforming, and householding specification is generated by the DIA. The cleansing routines selected by the DIA eliminate or fix bad records from the data, for example eliminating records without values in required fields. The transforming routines deal with changing the data type, math, and semantics of the data. Householding routines perform filtering of records to appropriately group together similar records. For example, householding routines are able to group together many services provided to a single user and identify them in relation to the user. In this manner, using a telephone example, even though a person may use differing telephone services (long distance, calling card, local and toll calls) all of the services are identified as related to the same individual.

Execution of the cleansing, transforming, and householding operations on the data in the database management system occurs in step 118.

In step 120, the data is converted into loadable format for eventual loading into the data warehouse using either the MLOAD, FastLoad, or TPump utilities of the Teradata RDBMS.

Construction of the data warehouse occurs in step 122 using SQL code generated by the ERwin model from step 106. In this step, the tables and fields of the data warehouse corresponding to the PDM are instantiated within the database management system.

Once the data warehouse has been constructed in step 122 and the data converted into loadable format in step 120, the data warehouse is loaded with the data in step 124 using either the MLOAD, FastLoad, or TPump utilities. Since much of the information required for creation and population of the data warehouse is not stored in the database management system, the manual and human intensive steps making up flowchart 100 must be repeated for each and every iteration or modification of the data warehouse. This results in a large amount of duplicated data and work effort for each iteration.

Currently, the information required for creation and population of the data warehouse is stored on paper or in the knowledge-base of the individual worker. This can be problematic if changes are necessitated and either the worker is no longer available or the papers are not available or are disorganized. In either situation, reproducing or modifying the data warehouse is difficult. Therefore, there is a need in the art to achieve reproducibility of the creation and population of a data warehouse.

SUMMARY OF THE INVENTION

Accordingly, an object of the present invention is to decrease the amount of effort and duplication of data and work effort during the creation and population of a data warehouse.

Another object of the present invention is to be able to reproduce the creation and population of a data warehouse automatically.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

FIG. 2 is a block diagram of an exemplary computer system; and

DETAILED DESCRIPTION OF THE DRAWING

Figure 1:
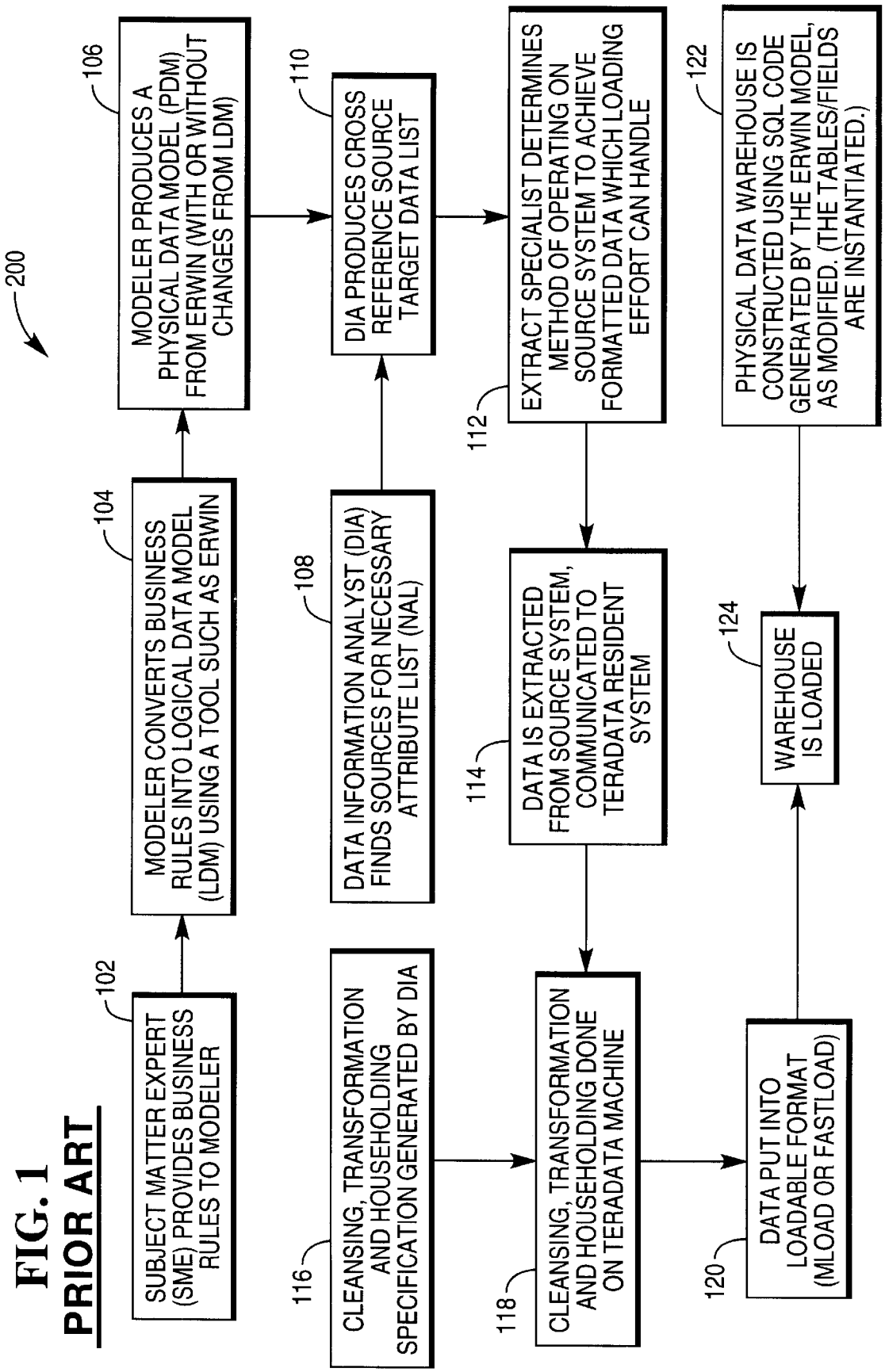
FIG. 1 is a high level flow chart of a prior approach.

FIG. 2 is a block diagram illustrating an exemplary computer system 200 upon which an embodiment of the invention may be implemented. The present invention is usable with currently available personal computers, mini-mainframes and the like.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Computer system 200 may be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of a computer system 200, such as the illustrated system, to generate a logical data model and a physical data model of a data base, maintain correspondence between the logical data model and physical data model, and create a data warehouse using a physical database design and data description language created from the physical data model. According to one embodiment of the invention, the logical data model, physical data model, data warehouse and display is provided by computer system 200 in response to processor 204 executing sequences of instructions contained in main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, a DVD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 200 also includes a communication interface 218 coupled to the bus 202. Communication interface 208 provides a two-way data communication as is known. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. In the preferred embodiment communication interface 218 is coupled to a virtual blackboard. Wireless links may also be implemented. In any such implementation, communication interface 218 sends and receives electrical, electromagnetic or optical signals which carry digital data streams representing various types of information. For example, two or more computer systems 200 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP)

226. ISP 226 in turn provides data communication services through the world wide packet data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for information discovery and visualization as described herein.

The received code may be executed by processor 204 as it is received, and/or stored in storage device 210, or other non-volatile storage for later execution. In this manner, computer system 200 may obtain application code in the form of a carrier wave.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

Figure 3A:
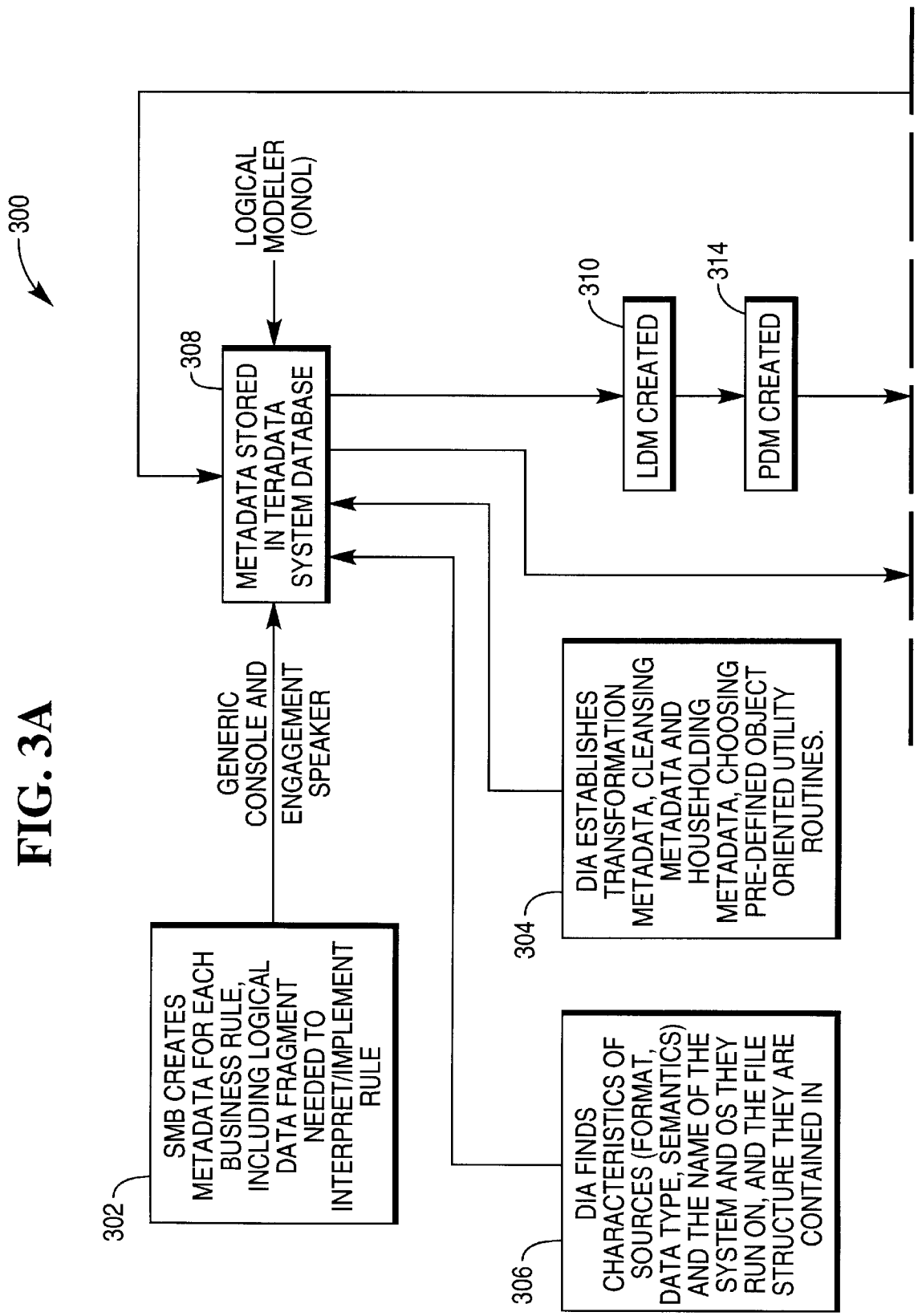
FIG. 3 is a high level flow chart of the present invention.
Figure 3B:
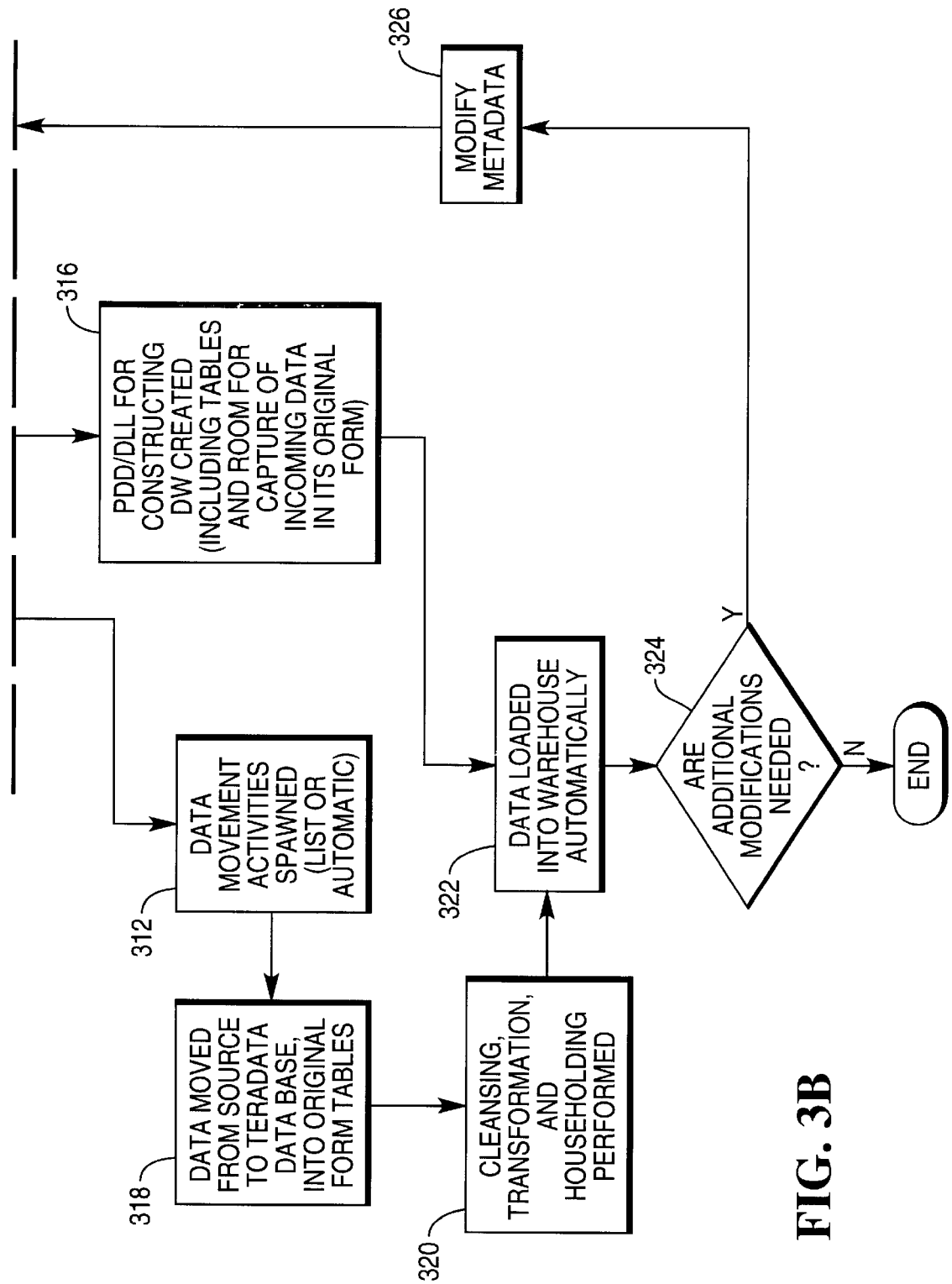

FIG. 3 is a high level flow chart of the steps included in a generic data modeling (GDM) tool, generally indicated by reference numeral 300. The goal of he GDM tool 300 is to create a logical and physical data model and a corresponding data warehouse, generate extraction and loading routines for the data, and extracting and loading the data into the created data warehouse. The GDM tool includes a database management system(not shown) for storing data, metadata, and extraction and loading routines. An example database management system is the Teradata Meta Data Services available from the NCR Corporation.

Metadata is data about data; metadata provides the technical and business context for the data stored in the data warehouse. The business context of the metadata includes what data is available, the origin of the data, when the data was captured and how the data was transformed on its way to a data warehouse. The technical context of the metadata includes information about the organization of the data warehouse, where the data is located, how each table fits into the data architecture.

At the outset in parallel activities, LDM structure metadata including table structures and potential reference identifications are created in step 301, business rule metadata is created in step 302 and transforming, cleansing, and householding metadata is selected in step 304 and data source characteristics are determined in step 306 for performing later described steps. The first time through the process, a logical modeler creates generic individual LDM structure metadata in step 301. The generic LDM structure metadata is modified in subsequent customer interactions to be specific to the intended customer application.

In step 302, the subject matter expert creates business rule metadata corresponding to each business rule including the logical data fragment necessary for interpreting and implementing the business rule. The initial pass through step 302 creates generic business rule metadata applicable to many different applications. Subsequent iterations refine and customize the business rule metadata to be specific to the intended customer application.

During execution of step 304, the DIA determines the utility metadata, including extraction, loading, transformation, cleansing, and householding metadata, from a set of predefined object oriented utility routines. At this point, the DIA identifies additional utility metadata required but not present in the predefined set. As additional utility metadata is identified, the DIA can create and add object oriented utility routines to support the utility metadata to the set of predefined routines. During step 304, the utility routines for extracting, loading, cleansing, transforming, and householding metadata are tested and verified usable in the database management system.

In step 306, the DIA determines the data source characteristics, such as data format, type and semantics. Further, the name, type of operating system, file structure and additional characteristics of the data source system are determined by the DIA. Additional characteristics include key use (whether the field is a primary key), nullability (whether the field may contain a null value), source need (whether the source must be in the data warehouse), and importance (how important the data is to the data warehouse). Key use and nullability are mandatory characteristics and source need and importance are optional characteristics. The data source and other characteristics are stored in the metadata of the database management system.

In step 308, the DIA stores the metadata in the database management system of the GDM tool 300. Once the metadata is stored in step 308, the flowchart sequence branches with the LDM creation in step 310 and initiation of data movement activities in step 312.

A description of the LDM creation branch follows. LDM creation is performed by the DIA using the LDM creation routines of the GDM tool 300 and the stored metadata. After creating the LDM in step 310, the DIA creates the corresponding PDM, in step 314, using the GDM tool 300 and the LDM resulting from step 310. Correspondence between the LDM and PDM is mandated and enforced by the GDM tool 300. Changes made to the LDM and PDM using the tool 300 are automatically effected in the data and metadata of the database management system. LDM to PDM correspondence checking routines are provided in tool 300 to check and correct divergence between the LDM and PDM.

In step 316, the DIA uses the GDM tool 300 to create the physical database design (PDD) and data description language (DDL) used to construct the data warehouse of the database management system. The data warehouse constructed includes the necessary tables and additional storage for the capture of incoming data from the data sources in original form.

Continuing with the data movement branch of step 312, the data movement or data extraction activities are initiated upon construction of the data warehouse in step 316. The data movement activities are either automatic or manually effected by the DIA. When the database management system is electronically connected to the data source systems, data movement is performed automatically. When no connection exists, a list detailing the data to be extracted from the data source systems is generated for use by the DIA to manually move the data. During the manual data movement, the DIA makes use of data extraction facilities at the data source systems to move the identified data to a transfer media, such as a floppy disk, tape or other magnetic media, or optical or other storage media.

Data movement from the data source systems to the GDM tool 300 occurs in step 318. The data is moved, using the extraction and loading routines selected in step 304, into original form tables, defined in step 316, in the database management system of the tool 300.

In step 320, cleansing, transforming, and householding routines, as described above, are executed on the data moved to the original form tables in step 318.

The data movement branch and the LDM creation branch converge to automatically load the data into the data warehouse of the GDM tool 300 in step 322. At this point, queries are executed against the data in the data warehouse.

In step 324, the data warehouse performance (response time, accuracy, system load) is analyzed and the DIA determines if additional modifications to the data warehouse are necessary. If the data warehouse performance fails to meet customer requirements necessitating additional modification or customization, the metadata is modified by the DIA and the process starts over again at step 308 with all of the metadata previously entered stored in the system database. The LDM is created (step 310), the PDM is created (step 314), and the PDD and DDL are created (step 316). Upon creation of the data warehouse from the PDD and DDL, the data movement activities are started (step 312) and data moved from the source systems to the original form tables (step 318). Cleaning, transformation, and householding routines are performed on the original form table data (step 320) and the data is then loaded into the data warehouse (step 322). Queries are executed against the data in the data warehouse and the data warehouse performance is analyzed. If the data warehouse performance meets or exceeds the customer requirements (step 324), the process is complete.

An example is helpful in describing the process of creating and populating a data warehouse. At the outset, several activities are performed in parallel. The logical modeler creates individual table structures and identifies potential table references at a generic level. A SME identifies and creates generic business rule metadata. The generic business rule metadata includes logical data fragments necessary to implement the business rule. A DIA selects generic cleansing, transformation and householding metadata from a predefined list of utility routines. The DIA determines generic characteristics (e.g., data format, data type, and semantics) of data sources and generic characteristics (e.g., system name, operating system, and file structure) of source systems hosting the data. The first time through the process there may be no or minimal data and data sources. As a result of each of these steps, metadata generic to many business applications is stored in a database management system as described above. It is understood by those of skill in the art that the activities described above may be performed sequentially.

Once the generic metadata is stored in the database management system, the DIA causes the creation of a generic LDM using the generic metadata. After the generic LDM is created, a generic PDM is created using the generic LDM. A generic PDD and DDL are created using the generic PDM. The generic PDD and DDL are used to construct a generic data warehouse and include tables for capturing incoming data in original form in the database management system prior to execution of cleansing, transformation and householding routines.

Upon creation of the generic data warehouse, data movement activities are automatically initiated to move data from the identified data sources to the original form tables of the database management system. If the database management system is not electronically connected to the data sources, a data movement list is generated for the DIA's use in initiating the data movement activities. Because generic metadata and table structures are used the first time through the process, no or minimal data is actually moved into the database management system.

Once data movement has completed, the selected generic cleansing, transformation, and householding routines are executed on the data loaded in the original form tables. Upon completion of the generic cleansing, transformation, and householding routines execution, the data is loaded into the generic data warehouse using the above described data loading mechanisms.

After the data is loaded into the data warehouse, generic queries are executed using the data. At this point, a generic data warehouse including metadata has been setup.

The next process iteration results in a more refined data warehouse specific to a particular client application. As a result of client interaction or engagement, the SME refines the business rule metadata to reflect the client's business and the DIA refines the characteristics of the data and identifies the client specific data sources. The DIA also refines the cleansing, transformation and householding metadata selections and creates additional cleansing, transformation, and householding metadata as identified through client interaction. All of the resulting metadata modifications are stored in the metadata of the database management system.

The additional steps of creating the LDM, PDM, and PDD and DDL are executed as in the first iteration; however, the client specific changes to the metadata are incorporated as part of the now client specific LDM, PDM, and PDD and DDLs. The client specific data warehouse and original form tables are constructed in the database management system from the client specific PDD and DDL. Upon creation of the original form tables, the data movement activities are initiated moving client specific data from client data sources into the original form tables. The generic and client specific cleansing, transformation, and householding routines are executed on the data in the original form tables. After the cleansing, transformation, and householding routines are complete, the data is loaded into the client specific data warehouse.

Once the client specific data warehouse is loaded with client specific data, queries are once again executed to determine if client requirements are met. If client requirements are not met, the process is iterated again with more modifications to the metadata. In this fashion, the process can be iterated multiple times, if necessary, making changes to the metadata. If the client requirements are met, the metadata, data warehouse, and database management system are complete and ready for use by the client.

The present invention decreases the amount and duplication of effort and data during the creation and population of a data warehouse by using automated data model creation mechanisms and predefined extraction and loading routines. Data is automatically extracted from data sources, cleansed, transformed, and househeld, and loaded into the data warehouse. Complete reproducibility of the creation and population of the data warehouse is achieved.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of generating a logical data model, a physical data model, extraction and loading routines for a data warehouse, the method comprising the steps:

creating business rule metadata;

determining characteristics of data from one or more data sources;

selecting transformation, cleansing, and householding metadata in accordance with said characteristics of data;

storing said metadata and said transformation, cleansing and householding metadata in a database management system;

creating a logical data model from said metadata;

creating a physical data model from said logical data model;

creating a physical database design and data description language for creating a data warehouse from said physical data model;

creating said data warehouse;

moving said data from said one or more data sources into said database management system;

executing said cleansing, transforming, and householding metadata on said loaded data in said database management system; and loading said cleansed, transformed, and househeld data into said data warehouse.

2. The method as in claim 1 further comprising the step of creating transformation, cleansing, and householding metadata.

3. The method as in claim 1 wherein said step of moving said data from said one or more data sources into said database management system is performed manually.

4. The method as in claim 1, further comprising the steps of:

refining said business rule metadata; and storing said refined metadata in said database management system.

5. The method as in claim 1, further comprising the steps of:

refining said characteristics of data; and storing said refined characteristics in said database management system.

6. The method as in claim 1, further comprising the steps of:

refining said transformation, cleansing, and householding metadata; and storing said refined transformation, cleansing, and householding metadata in said database management system.

7. The method as in claim 1, further comprising the steps of:

analyzing data warehouse performance; and if the data warehouse performance fails to meet or exceed specified requirements, modifying at least one of said business rule metadata, said characteristics of data, and said transformation, cleansing, and householding metadata and storing said modifications in said database management system.

8. The method as in claim 7, further comprising the step of:

if the data warehouse performance fails to meet or exceed specified requirements, performing said creating, determining, selecting, storing, creating a logical data model, a physical data model, a physical database design and data description language, a data warehouse, moving, executing, and loading steps.

9. A computer system for generating a logical data model, a physical data model, extraction and loading routines for a data warehouse, comprising:

a processor;

a memory coupled to said processor, the memory having stored therein sequences of instructions which, when executed by said processor, cause said processor to:

create metadata corresponding to user input business rules;

store user input characteristics of data from one or more data sources in a database management system;

present existing transformation, cleansing, and householding metadata to user for selection by user;

store said user input business rule metadata and said user selected metadata and said transformation, cleansing and householding metadata, and said user input characteristics of data from one or more data sources in a database management system;

support user creation of and storage of a logical data model from said database management system;

create a physical data model from said logical data model;

create a physical database design and data description language for creating a data warehouse from said physical data model;

create said data warehouse;

move said data from said one or more data sources into said database management system;

execute said cleansing, transforming, and householding metadata on said loaded data in said database management system; and load said cleansed, transformed, and househeld data into said data warehouse.

10. The computer system as in claim 9 further comprising sequences of instructions which, when executed by said processor, cause said processor to:

create transformation, cleansing, and householding metadata.

11. The computer system as in claim 9 wherein said sequences of instructions for moving said data from said one or more data sources into said database management system is performed manually.

12. The computer system as in claim 9, further comprising sequences of instructions which, when executed by said processor, cause said processor to:

refine said business rule metadata; and store said refined metadata in said database management system.

13. The computer system as in claim 9, further comprising sequences of instructions which, when executed by said processor, cause said processor to:

refine said characteristics of data; and store said refined characteristics in said database management system.

14. The computer system as in claim 9, further comprising sequences of instructions which, when executed by said processor, cause said processor to:

refine said transformation, cleansing, and householding metadata; and store said refined transformation, cleansing, and householding metadata in said database management system.

15. The computer system as in claim 9, further comprising sequences of instructions which, when executed by said processor, cause said processor to:

analyze data warehouse performance; and if the data warehouse performance fails to meet or exceed specified requirements, modify at least one of said business rule metadata, said characteristics of data, and said transformation, cleansing, and householding metadata and store said modifications in said database management system.

16. The computer system as in claim 9, further comprising sequences of instructions which, when executed by said processor, cause said processor to:

if the data warehouse performance fails to meet or exceed specified requirements, perform said creating, determining, selecting, storing, creating a logical data model, a physical data model, a physical database design and data description language, a data warehouse, moving, executing, and loading instructions.

* * * * *